Oct. 3, 1939.   L. A. LOGAN   2,174,666
APPARATUS FOR RECOVERING FLUIDS BY ADSORPTION
Filed Aug. 31, 1937
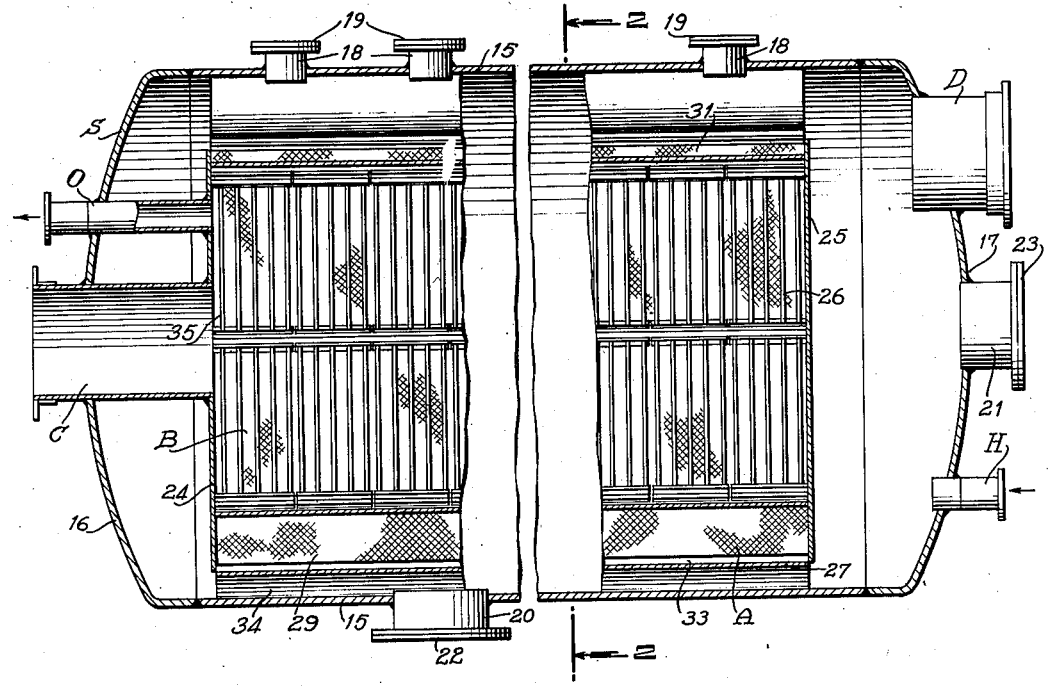
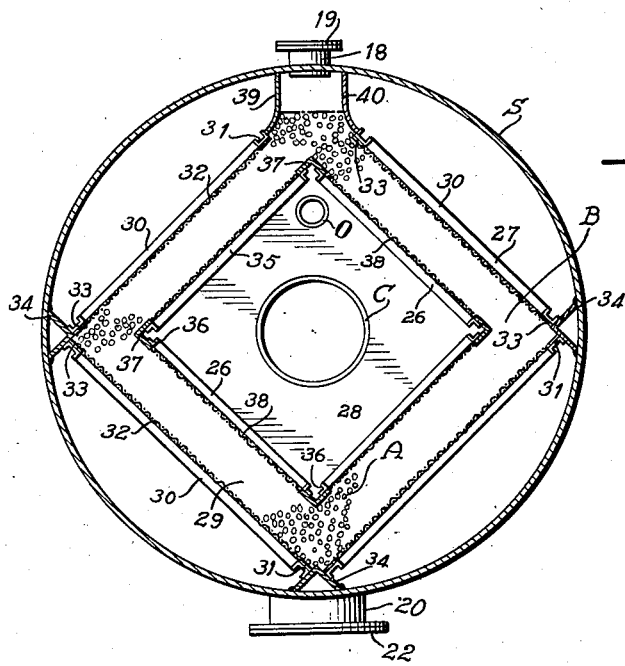
INVENTOR
LEONARD A. LOGAN
BY
Charles C. Scheffler
ATTORNEY Patented Oct. 3, 1939

2,174,666

UNITED STATES PATENT OFFICE 2,174,666

APPARATUS FOR RECOVERING FLUIDS BY ADSORPTION

Leonard A. Logan, Flushing, N. Y., assignor to Carbide and Carbon Chemicals Corporation, a corporation of New York Application August 31, 1937, Serial No. 161,734

5 Claims. (Cl. 183—4)

The invention relates to adsorption apparatus, particularly to improved equipment for recovering fluid components from mixtures thereof with air or other gases by means of a solid adsorbent material. In a preferred embodiment the structure is especially adapted for use with activated carbon, although the invention is not limited with respect to the nature of the adsorbent.

Separation and recovery of fluids by adsorption is shown in various forms in the prior art. A common type of adsorber structure consists of a container vessel, usually of metal, provided with a layer or bed of solid adsorbent through which fluid mixtures to be treated are forced to pass when introduced into the container. The adsorbed vapors are recovered by periodically heating the adsorbent when its adsorptive capacity has been substantially reached, and where activated carbon serves as the adsorbent, heating or revivifying of the carbon is usually effected by passing steam in direct contact therewith. A practical application of such apparatus is found in many industries wherein a volatile solvent material becomes diffused in the air through evaporation, and recovery of the solvent therefrom is desirable for economical or other reasons.

In solvent recovery from air very large volumes of gas must be treated, requiring provision for contacting the air mixture with large bed areas of adsorbent material. With prior structures this has necessitated apparatus of excessive and uneconomical size, or the employment of a plurality of adsorber units. The fluid being recovered is also often corrosive in nature to the ordinary steel structure of the adsorber vessel, and the vapor mixture or condensate evolved on steaming of the adsorbent will generally cause excessive corrosion if allowed to contact with the container walls. When an adsorbent such as activated carbon is employed, which is adversely affected in adsorptive capacity by presence of moisture, wetting of the adsorbent bed by condensate on steaming must be avoided for best efficiency, and segregation of moisture in portions only of the adsorbent is particularly undesirable, since this reduces the effective adsorptive capacity of the entire adsorbent bed.

It is an object of the present invention to avoid the above-mentioned difficulties, one or more of which are quite commonly encountered in known adsorption apparatus. A further object is to provide an adsorber structure of improved efficiency in its ability to treat large volumes of gas within a given and reasonable size of apparatus. Another object concerns the arrangement of the interior structure of an adsorber vessel in a manner fully protecting the vessel walls from corrosion by the steam and adsorbed vapor mixture, and preventing wetting of the adsorbent bed or any portion thereof by condensate within the container vessel.

The manner of accomplishing these objects, and other novel features of the invention will be apparent from a description of the accompanying drawing, in which:

Fig. 1 is a longitudinal mid-section through an adsorber embodying the features of this invention; and Fig. 2 is a cross-section on the line 2—2 of Fig. 1.

Essential elements of the structure as shown comprise a cylindrical closed container vessel S, within which there is supported the frame or basket B in the general form of a hollow square and extending longitudinal through the larger portion of the container. A solid granular adsorbent A, preferably of activated carbon is contained within and throughout the entire length of the basket B. The supply conduit C for fluid mixtures to be treated extends through the wall of the vessel S and terminates inside the basket B, and a discharge D for denuded air or vapor provides passage from the space about the outer part of the basket B through the wall of the vessel. The inner and outer adsorbent retaining walls of the basket B are composed almost entirely of a foraminous material, and the adsorbent A forms a partition through which all gases must pass in traversing the adsorber vessel. Means for steaming the adsorbent to remove adsorbed material are provided by the steam inlet H with its inner terminal outside of the basket, and the steam outlet O for taking off the steam-vapor mixture from the space within the basket B. Thus the steam flow is in the reverse direction through the adsorbent to the travel of the gas during the adsorption cycle, and the steam-vapor mixture is taken off entirely out of contact with the inner walls of the container vessel.

With reference to the further structural details the shell S is preferably of steel, and comprises a cylindrical portion 15 to the ends of which are welded convex head sections 16 and 17 respectively to complete the closed vessel. The adsorber as shown is positioned with its longitudinal axis in a horizontal plane, although in use, and with very slight modifications, the adsorber will function equally well in either a horizontal or vertical position. A series of flanged nozzles 18, welded into openings at the top of the container, and normally closed by covers 19, provide means for supplying adsorbent material such as activated carbon to the basket B. Flanged manhole nozzles 20 and 21 are welded respectively into the bottom of the vessel and the center of the convex head section 17, and are normally closed by covers 22 and 23. The supply conduit C extends through the head section 16 axially of the container S and terminates in a central opening in a transverse square plate 24 which forms one end of the basket B. The discharge conduit D for unadsorbed gases is welded into the opposite head section 17.

The transverse square plate 24, and an oppositely disposed one 25 form fluid-tight vertical end connections to the basket B and prevent fluid flow within the adsorber other than in a path directly through the adsorbent bed. Foraminous support members comprise an inner unit 26 and an outer unit 27 uniformly spaced from each other a sufficient distance to provide the adsorbent bed a thickness desired. Each unit comprises four frames extending longitudinally of the shell between the plates 24 and 25 and joined along their longitudinal edges, the respective frames of the inner and outer units being parallel. Thus, a central space 28 rectangular in cross-section is partitioned off from the rest of the container vessel and that portion thereof lying outside of the unit 27.

Each frame of the outer unit 27 comprises a series of bars 30 having their ends welded to longitudinal channel members 31, and a foraminous plate 32 supported by the inner sides of the bars 30 and attached to the channel members 31 by means of longitudinal bars 33 fastened to the channel members. The channel members 31 are welded to longitudinal angles 34 which have their legs welded along the inside of the shell S. The outer units are preferably made in sections which may contain, for instance, five bars each, and the longitudinal angles 34, may be provided in lengths sufficient to accommodate each section, the lengths being spaced from each other by a fraction of an inch. Any moisture condensing upon the shell may, therefore flow downwardly between the angles without collecting in the V formed between the angles and the channel 31, and without contacting with the adsorbent bed. The foraminous plate 32 is preferably continuous between the transverse square plates 24 and 25.

Similarly, the frames of the inner unit 26 are formed of a series of bars 35. Each of these bars has its ends welded to longitudinal angles 36 which are in turn welded to connecting angles 37, which hold the frames of the unit together. The ends of the connecting angles 37 are welded to the transverse square plates 24 and 25, and foraminous plate members 38 are attached to the outer sides of the bars 35 of the inner unit completing the construction.

The channels along the upper part of the outer frame 27 are welded to bent plates 39 and 40, which are in turn welded in spaced relation along the upper part of the shell S on either side of the flanged nozzles 18. Accordingly, granular adsorbent material supplied at this point will drop between the plates 39 and 40 and will fill the chamber 29 between the foraminous plate members 38 and the corresponding members 32.

All parts of the basket member B and its associated structural supports are preferably of light weight and of a metal of low heat capacity, so that when the steaming cycle is initiated these parts rapidly attain steam temperature and promote as little condensation as possible. What little steam does condense readily flows to the bottom of the container vessel where it can be drawn off without contacting the adsorbent. The vapor mixture evolved on steaming does not come in contact with any part of the container walls, thereby eliminating corrosion of this part of the adsorber, or the necessity of employing corrosion-resistant expensive metals in all or part of the container wall structure. The foraminous basket structure of light weight material can with economy be made of corrosion-resistant metal, so that substantially no corrosion is encountered in any part of the adsorber apparatus by any steam-vapor mixture or condensate. Ready removal and replacement of all or part of the basket structure is possible, providing a further advantage in case of failure of any portion of the interior structure.

This particular arrangement of the adsorbent bed, which is preferably of granular activated carbon, also provides a total bed area considerably in excess of that usually employed in an individual adsorber unit, thereby providing a much greater gas treating volume per unit size of adsorber vessel than has heretofore been possible. Improved efficiency results in the complete adsorber system, particularly in applications for solvent recovery from air or in other capacities where large gas volumes must be handled.

Modifications in the particular structure shown will be apparent within the scope of the invention, and other embodiments of the principles here involved many suggest themselves to those skilled in the art. The invention should not be limited other than as defined in the appended claims.

I claim:

1. An adsorber for removing solvent vapors from mixtures thereof with air, said adsorber comprising a horizontally disposed closed container vessel, a bed of activated carbon adsorbent in said vessel, means including a corrosion-resistant foraminous basket of a longitudinally extending hollow square structure for supporting said bed, support means at the corners of said basket and at the ends thereof adapted to restrict fluid flow in the adsorber to a path through said adsorbent, and fluid inlet and exit means adapted to prevent contact of evolved vapor mixtures on steaming with the inner walls of said vessel.

2. An adsorber for removing solvent vapors from mixtures thereof with air, said adsorber comprising a horizontally disposed closed container vessel, a bed of activated carbon adsorbent in said vessel, means including a corrosion-resistant foraminous basket of a longitudinally extending hollow square structure for supporting said bed, detachable support means at the corners of said basket and at the ends thereof adapted to restrict fluid flow in the adsorber to a path through said adsorbent, inlet means for the air-solvent mixture within the interior of said basket and exit means for denuded air exterior thereof, and steam inlet means exterior of said basket and an exit for the steam-vapor mixture within the interior thereof.

3: In an adsorber apparatus, the combination of a horizontal cylindrical container vessel, a bed of activated carbon adsorbent in said vessel, means including parallel spaced foraminous members forming a longitudinally extending hollow square basket structure for confining said adsorbent about a free central space, end support plates attached to said basket and closing the ends of said central space to fluid flow, corner supports for said basket including angle members attaching the same to the inner wall of the container vessel in a position maintaining each side of said basket at substantially an angle 45 degrees to the vertical axis of said container, inlet means for introducing vapor to be adsorbed to the central space within said basket, exit means for removing unadsorbed vapors from the exterior of said basket, and steam inlet and exit means in the reverse position to the aforesaid inlet and exit means.

4. In an adsorber apparatus for removing solvent vapors from air, the combination of a horizontal cylindrical container, a bed of activated carbon adsorbent in said vessel, parallel spaced corrosion-resistant readily detachable foraminous members forming a longitudinally extending hollow square basket structure throughout a substantial portion of said vessel and confining said adsorbent about a free central space, vertical end support plates attached to said basket and closing the ends of said central space to fluid flow, longitudinally disposed readily detachable corner supports for said basket including angle members attaching the same to the inner wall of said vessel in a position maintaining each side of said basket at substantially an angle of 45 degrees to the vertical axis of said container, inlet means for introducing air-vapor mixture directly to the central space within said basket, exit means for removing denuded air from the exterior of said basket, and steam inlet and exit means in the reverse position to the aforesaid air inlet and exit means, whereby the mixture of steam and adsorbed vapor is prevented from contacting with the wall of the container vessel.

5. In an adsorber apparatus for removing solvent vapors from air, the combination of a horizontal cylindrical container, a bed of activated carbon adsorbent in said vessel, parellel spaced corrosion-resistant readily detachable foraminous members forming a longitudinally extending hollow square basket structure throughout a substantial portion of said vessel and confining said adsorbent about a free central space, vertical end support plates attached to said basket and closing the ends of said central space to fluid flow, longitudinally disposed readily detachable corner supports for said basket including angle members attaching the same to the inner wall of said vessel, in a position maintaining each side of said basket at substantially an angle of 45 degrees to the vertical axis of said container, spaced filler openings in the top of said container communicating with the upper corner of said basket, inlet means for introducing air-vapor mixture directly to the central space within said basket, exit means for removing denuded air from the exterior of said basket, and steam inlet and exit means in the reverse position to the aforesaid air inlet and exit means, whereby the mixture of steam and adsorbed vapor is prevented from contacting with the wall of the container vessel.

LEONARD A. LOGAN.